United States Patent
You (10) Patent No.: US 11,702,845 B2
(45) Date of Patent: Jul. 18, 2023

(54) LAYERED THERMOPLASTIC STRUCTURE WITH REFLECTIVE INTERMEDIATE LAYER AND METHOD OF MANUFACTURE

(71) Applicant: CertainTeed Corporation, Malvern, PA (US)

(72) Inventor: Sizhu You, Auburndale, MA (US)

(73) Assignee: CertainTeed LLC, Malvern, PA (US)

( * ) Notice: Subject to any disclaimer, the term of this patent is extended or adjusted under 35 U.S.C. 154(b) by 419 days.

(21) Appl. No.: 16/785,188

(22) Filed: Feb. 7, 2020

(65) Prior Publication Data

US 2020/0256065 A1 Aug. 13, 2020

Related U.S. Application Data

(60) Provisional application No. 62/803,030, filed on Feb. 8, 2019.

(51) Int. Cl.
| | |
|---|---|
| *E04F 13/18* | (2006.01) |
| *B32B 27/08* | (2006.01) |
| *B29C 48/21* | (2019.01) |
| *E04C 2/20* | (2006.01) |
| *B29L 31/00* | (2006.01) |
| *B29K 101/12* | (2006.01) |

(52) U.S. Cl.
CPC ............ *E04F 13/18* (2013.01); *B29C 48/21* (2019.02); *B32B 27/08* (2013.01); *E04C 2/20* (2013.01); *B29K 2101/12* (2013.01); *B29K 2995/003* (2013.01); *B29L 2031/776* (2013.01); *B32B 2307/304* (2013.01); *B32B 2419/00* (2013.01)

(58) Field of Classification Search
None
See application file for complete search history.

(56) References Cited

U.S. PATENT DOCUMENTS

| | | |
|---|---|---|
| 6,296,732 B1 | 10/2001 | Enlow |
| 7,846,548 B2 | 12/2010 | You |
| | (Continued) | |

FOREIGN PATENT DOCUMENTS

EP 320632 A2 * 11/1992 ............. B32B 27/08

OTHER PUBLICATIONS

Machine translation of EP 320632 A2 (Year: 1988).*
International Search Report and Written Opinion in PCT/US2020/017269, dated Jun. 8, 2020.

*Primary Examiner* — Ramsey Zacharia
(74) *Attorney, Agent, or Firm* — McDonnell Boehnen Hulbert & Berghoff LLP (57) ABSTRACT

The present disclosure relates generally to polymer structures, for example, suitable for construction products. The present disclosure relates more particularly to a thermoplastic construction product including a coextruded layer structure having a base layer including a first thermoplastic material, an outer layer including a second thermoplastic material, and an infrared-reflective intermediate layer that is coextruded with the base layer and the outer layer and is disposed between the base layer and the outer layer. In some embodiments the intermediate layer has a thickness of at least 30 micrometers. In some embodiments the infrared-reflective intermediate layer includes a reflective pigment dispersed in a matrix of one of the first thermoplastic material or the second thermoplastic material.

19 Claims, 7 Drawing Sheets

(56) References Cited

U.S. PATENT DOCUMENTS

| | | |
|---|---|---|
| 9,200,448 B2 | 12/2015 | Buehne |
| 2002/0197449 A1 | 12/2002 | Wende |
| 2003/0148093 A1 | 8/2003 | Gorny |
| 2006/0013994 A1 | 1/2006 | Burke |
| 2007/0092707 A1 | 4/2007 | Anderson |
| 2010/0132295 A1 | 6/2010 | Bootier |
| 2016/0303836 A1* | 10/2016 | Parks .................... B32B 27/304 |

* cited by examiner

LAYERED THERMOPLASTIC STRUCTURE WITH REFLECTIVE INTERMEDIATE LAYER AND METHOD OF MANUFACTURE

CROSS REFERENCE TO RELATED APPLICATIONS

This application claims the benefit of priority of U.S. Provisional Patent Application No. 62/803,030, filed Feb. 8, 2019, which is hereby incorporated herein by reference in its entirety.

BACKGROUND OF THE DISCLOSURE

1. Field of the Disclosure

The present disclosure relates generally to polymer structures, for example, suitable for construction products. The present disclosure relates more particularly to a thermoplastic construction product including a coextruded layer structure.

2. Technical Background

The use of thermoplastic polymers in construction products has increased in popularity over time. Various thermoplastics have desirable characteristics for forming construction products. Moreover, particular thermoplastics can be layered or mixed to take advantage of different benefits of each material. Such construction products can be very durable, easily formed into desired shapes, and relatively inexpensive.

In particular, layered thermoplastic structures are popular for a variety of different construction products that are exposed to the sun and weather. For example, layered thermoplastic structures are widely used for cladding material, such as siding and roofing, fencing, and decking. Further, there is increasing demand for these products in a variety of different shapes, sizes, and colors.

While layered thermoplastic construction products have various different advantages, these products can be subject to heat distortion if they undergo excess heating. If a thermoplastic product absorbs too much energy from the sun, its temperature can rise above the heat deflection temperature of the thermoplastic material, resulting in warping, curling or "oil canning." In extreme cases, the products can melt.

The problem of heat buildup is more prevalent with thermoplastic products in dark colors. Lighter colored products are inclined to reflect more of the sun's energy, having a more limited heat buildup than darker colors. While the surfaces of darker colored thermoplastic products can be modified to reflect more light, these products can appear shiny, or even metallic, which consumers and builders find unappealing.

The present inventor has recognized that thermoplastic construction products that are at a lower risk of heat distortion while maintaining desirable aesthetics would be attractive to builders and consumers.

SUMMARY OF THE DISCLOSURE

In one aspect, the present disclosure provides a thermoplastic construction product comprising:
a coextruded layered structure including:
a base layer including a first thermoplastic material;
an outer layer including a second thermoplastic material; and
an infrared-reflective intermediate layer that is coextruded with the base layer and the outer layer and is disposed between the base layer and the outer layer, the infrared-reflective intermediate layer having a thickness of at least 30 micrometers.

In another aspect, the disclosure provides a thermoplastic construction product comprising:
a coextruded layered structure including:
a base layer including a first thermoplastic material;
an outer layer including a second thermoplastic material; and
an infrared-reflective intermediate layer that is coextruded with the base layer and the outer layer and is disposed between the base layer and the outer layer, the infrared-reflective intermediate layer including an infrared-reflective pigment dispersed in a matrix of one of the first thermoplastic material or the second thermoplastic material.

In another aspect, the disclosure provides a method of manufacturing a construction product, the method comprising:
coextruding a base layer, an outer layer, and an infrared reflective intermediate layer through a die so as to form a coextruded layered structure; and
forming the coextruded layered structure into a construction product according to the disclosure.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that thermoplastic construction products are at a risk of heat distortion if they absorb too much energy from the sun. The present inventor has unexpectedly determined that a thermoplastic construction product with a relatively thin infrared-reflective intermediate layer can significantly reduce the risk of heat distortion.

Figure 1:
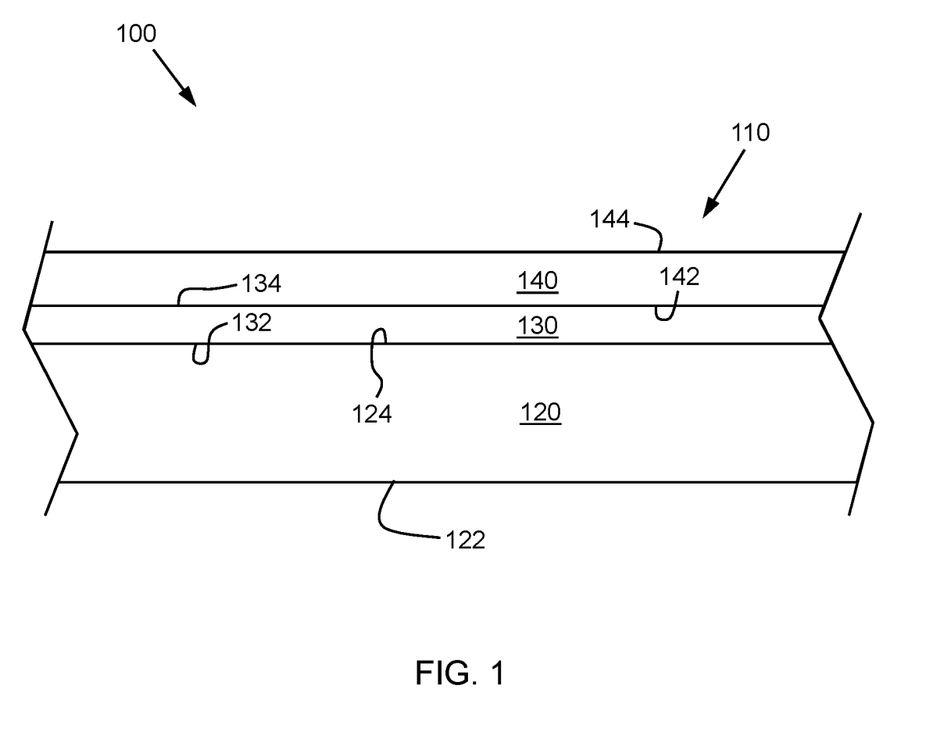
FIG. 1 is a schematic cross-sectional view of a portion of a thermoplastic layered structure according to an embodiment of the disclosure.

Accordingly, one aspect of the disclosure is a thermoplastic construction product comprising a coextruded layered structure including a base layer including a first thermoplastic material, an outer layer including a second thermoplastic material, and an infrared-reflective intermediate layer that is coextruded with the base layer and the outer layer and disposed between the base layer and the outer layer. A cross-sectional view of a portion of the coextruded layered structure of such a construction product is shown in FIG. 1. Construction product 100 includes coextruded layered structure 110 including a base layer 120, an outer layer 140 and an infrared-reflective intermediate layer 130 between base layer 120 and outer layer 140. Base layer 120 has an inner surface 122 and an outer surface 124. Likewise, infrared-reflective intermediate layer has an inner surface 132 and an outer surface 134 and outer layer 140 has an inner surface 142 and an outer surface 144.

In certain embodiments as otherwise described herein, inner surface 122 of base layer 120 and outer surface 144 of outer layer 140 are both exposed and subject to ambient conditions. In many embodiments, outer surface 144 of outer layer 140 is configured to be subject to solar radiation, while inner surface 122 is configured to be hidden from direct exposure to consistent sunlight. In some embodiments, either or both of inner surface 122 of base layer 120 and outer surface 144 of outer layer 140 is covered by a thin coating, such as a UV protective coating.

In certain embodiments as otherwise described herein, outer surface 124 of base layer 120 is adjacent to and in contact with inner surface 132 of infrared-reflective intermediate layer 130. In other embodiments one or more additional layer is positioned between the base layer and the infrared-reflective intermediate layer. In certain embodiments as otherwise described herein, outer surface 134 of infrared-reflective intermediate layer 130 is adjacent to and in contact with inner surface 142 of outer layer 140. In other embodiments one or more additional layer is positioned between the infrared-reflective intermediate layer and the outer layer 140.

The inventor has determined that there is a strong correlation between total solar reflectance and heat buildup. Indeed, for at least some structures there is an inverse linear relationship between total solar reflectance and heat buildup. Accordingly, by including an infrared-reflective intermediate layer within the layered structure, the solar reflectance of the structure can be increased and the heat buildup correspondingly decreased.

Figure 2:
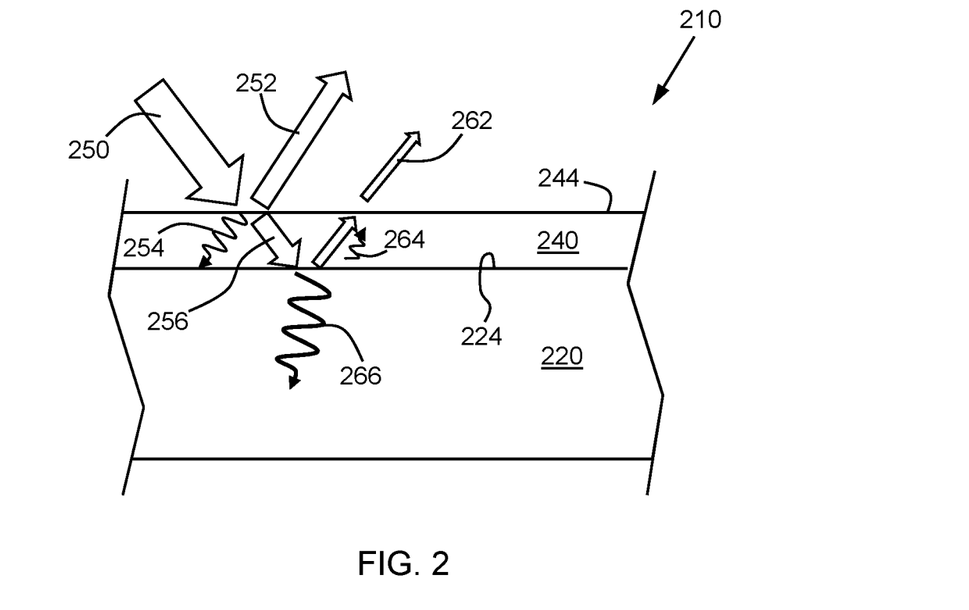
FIG. 2 is a schematic depiction of infrared light interaction with a cross-sectional view of a portion of a thermoplastic layered structure.
Figure 3:
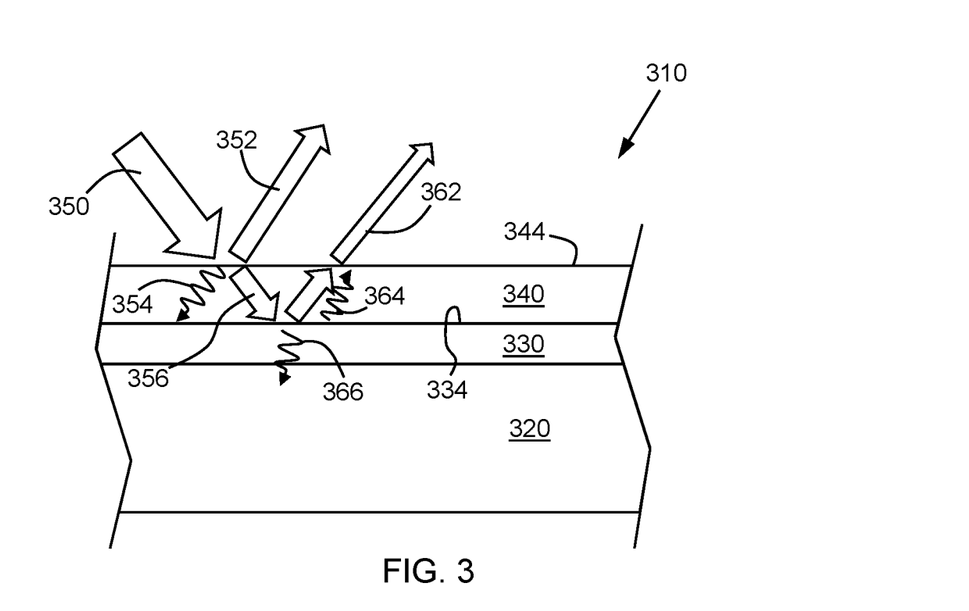
FIG. 3 is a schematic depiction of infrared light interaction with a cross-sectional view of the thermoplastic layered structure shown in FIG. 1.

FIGS. 2 and 3 illustrate the advantage of reflecting solar energy that is imparted by the infrared-reflective intermediate layer. Layered structure 210 shown in FIG. 2 includes only an outer layer 240 and a base layer 220. When infrared radiation 250 impinges upon the outer surface 244 of outer layer 240, a portion 252 of the light is reflected by the surface. Another portion of the light 254 is absorbed by the outer layer 240, while a third portion 256 is transmitted through outer layer 240 to base layer 220. The transmitted light 256 then impinges upon the outer surface 224 of base layer 220. Some of the transmitted light 256 is reflected by the base layer. A small portion 262 of this reflected light is emitted back out of the layer structure, while another portion 264 is absorbed by outer layer 240. The remaining portion 266 of the light transmitted through outer layer 240 is absorbed in base layer 220.

In contrast to layered structure 210, layered structure 310 shown in FIG. 3 includes only an outer layer 340, infrared-reflective intermediate layer 330, and base layer 320. When infrared radiation 350 impinges upon the outer surface 344 of outer layer 340, similar to layered structure 210, a portion 352 of the light is reflected by the surface. Likewise, another portion of the light 354 is absorbed by the outer layer 340, while a third portion 356 is transmitted through outer layer 340 to infrared-reflective intermediate layer 330. The transmitted light 356 then impinges upon the outer surface 334 of infrared-reflective intermediate layer 330. In contrast to layered structure 210, a large portion of the transmitted light 356 is reflected by the infrared-reflective intermediate layer 330. Of this reflected light, a portion 364 is absorbed by outer layer 340 and a significant portion 362 is emitted back out of the layered structure. The small remaining portion 366 of the light transmitted through outer layer 340 is absorbed in base layer 320.

In certain embodiments as otherwise described herein, the infrared-reflective intermediate layer has a thickness of at least 30 micrometers. In some embodiments, the infrared-reflective intermediate layer has a thickness of at least 50 micrometers, e.g., a thickness of at least 80 micrometers, e.g., a thickness of about 100 micrometers, e.g., a thickness of at least 100 micrometers, e.g., a thickness of about 200 micrometers, e.g., a thickness of at least 200 micrometers, e.g., a thickness of at least 300 micrometers, e.g., a thickness in a range of 400 to 500 micrometers.

The term thickness, as used herein, refers to the distance along a line that is perpendicular to two parallel sections of the opposing boundary surfaces of the layer. For example, in some embodiments, the intermediate layer includes at least some flat sections between two parallel flat boundary surfaces of the layer. In the particular example of infrared-reflective intermediate layer 130 in layered structure 110, the thickness is measured between outer surface 134 and inner surface 132 of the layer 130 along a line that is perpendicular to each of the surfaces. In other embodiments, infrared-reflective intermediate layer is curved in an arc. In such embodiments, the thickness is measured along a line that passes through two parallel sections of the inner and outer surfaces of the layer. It should be understood that the thickness does not need to be uniform throughout the entire structure. For example, in some embodiments, the layered structure is shaped into a particular profile that has bends and curves. In some embodiments, the thickness of layers varies at the locations of these bends, as will be appreciated by those of ordinary skill in the art. On the other hand, in some embodiments, the thickness of each of the layers is substantially uniform across a majority of the construction product. The phrase substantially uniform as used herein refers to a variance of less than 5%.

In certain embodiments as otherwise described herein, the infrared-reflective intermediate layer includes an infrared-reflective pigment dispersed in a thermoplastic matrix. The infrared-reflective pigment promotes the reflectance of the infrared-reflective intermediate layer so as to reduce the heat buildup within the layered structure and reduce the risk of heat distortion. In particular, in certain embodiments, the infrared-reflective pigment of the infrared-reflective intermediate layer provides the solar reflection increases and heat buildup reductions described in greater detail below.

In certain embodiments as otherwise described herein, the infrared-reflective pigment includes one or more of iron oxide pigments, titanium oxide pigments, composite oxide system pigments, titanium oxide-coated mica pigments, iron oxide-coated mica pigments, aluminum pigments, scaly aluminum pigments, silver pigments, zinc oxide pigments, copper phthalocyanine pigment, dissimilar metal (nickel, cobalt, iron, or the like) phthalocyanine pigment, nonmetallic phthalocyanine pigment, chlorinated phthalocyanine pigment, chlorinated-brominated phthalocyanine pigment, brominated phthalocyanine pigment, anthraquinone, quinacridone system pigment, diketo-pyrrolipyrrole system pigment, perylene system pigment, monoazo system pigment, diazo system pigment, condensed azo system pigment, metal complex system pigment, quinophthalone system pigment, Indanthrene Blue pigment, dioxadene violet pigment, anthraquinone pigment, metal complex pigment, benzimidazolone system pigment, and the like.

In certain embodiments the infrared reflective pigments are white, e.g., titanium oxide pigments.

Figure 4:
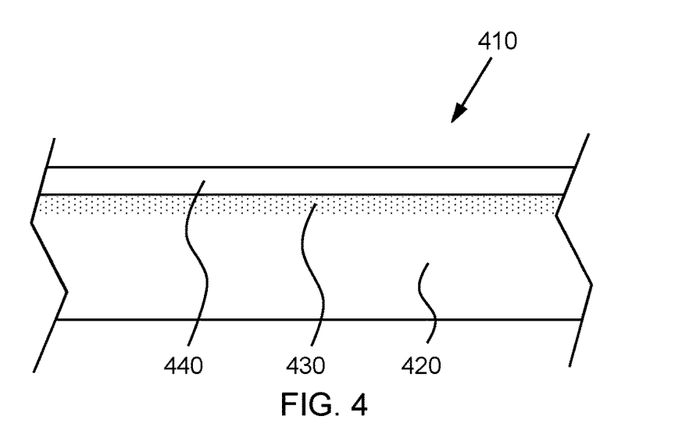
FIG. 4 is a schematic cross-sectional view of a portion of a thermoplastic layered structure according to another embodiment of the disclosure.

In certain embodiments as otherwise described herein, the infrared-reflective pigment is dispersed in a matrix of one of the first thermoplastic material or the second thermoplastic material. In some embodiments, the base layer is formed of a first thermoplastic material, the outer layer is a capstock layer formed of a second thermoplastic material that is different from the first thermoplastic material, and the intermediate layer includes an infrared-reflective pigment dispersed in a matrix of the first thermoplastic material. Accordingly, a smooth material transition is provided between the base layer and the infrared-reflective intermediate layer as the thermoplastic matrix material of both layers is the same, but the infrared-reflective intermediate layer includes infrared-reflective pigments providing an increased infrared reflectance of the intermediate layer. For example, layered structure 410 shown in FIG. 4 includes a base layer 420, an outer layer 440 and an infrared-reflective intermediate layer 430 between base layer 420 and outer layer 440. Infrared-reflective intermediate layer 430 is composed of the same thermoplastic material as base layer 420, with the addition of infrared-reflective pigments, as schematically depicted in FIG. 4.

Figure 5:
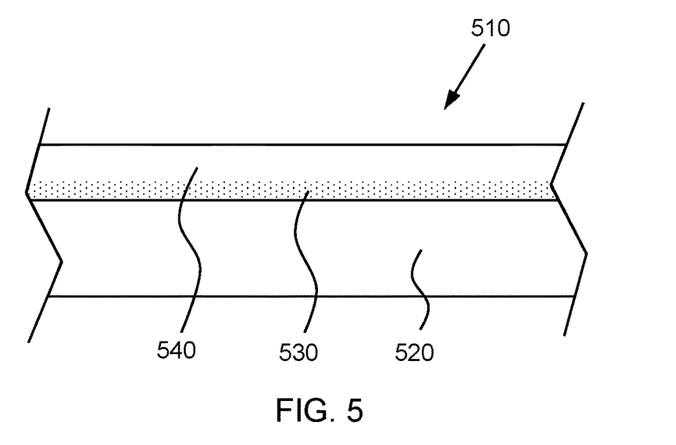
FIG. 5 is a schematic cross-sectional view of a portion of a thermoplastic layered structure according to yet another embodiment of the disclosure.

In other embodiments, the base layer is formed of a first thermoplastic material, the outer layer is a capstock layer formed of a second thermoplastic material that is different from the first thermoplastic material, and the intermediate layer includes an infrared-reflective pigment dispersed in a matrix of the second thermoplastic material. Accordingly, a smooth material transition is provided between the outer layer and the infrared-reflective intermediate layer as the thermoplastic matrix material of both layers is the same, but the infrared-reflective intermediate layer includes infrared-reflective pigments that provide an increased infrared reflectance of the intermediate layer. For example, layered structure 510 shown in FIG. 5 includes a base layer 520, an outer layer 540, and an infrared-reflective intermediate layer 530 between base layer 520 and outer layer 540. Infrared-reflective intermediate layer 530 is composed of the same thermoplastic material as outer layer 520, with the addition of infrared-reflective pigments.

Figure 6:
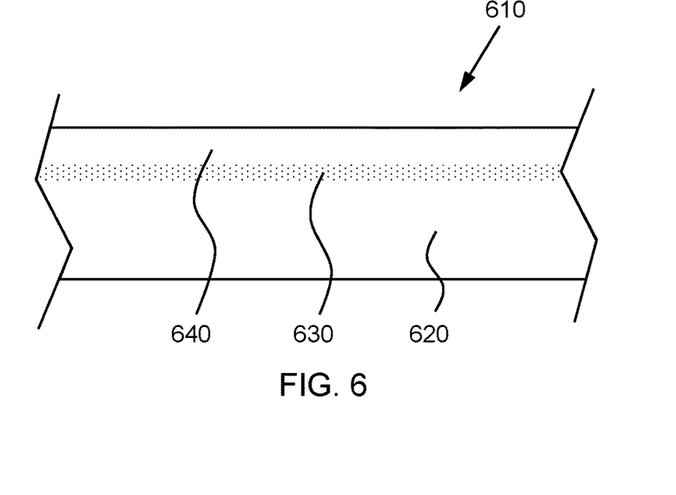
FIG. 6 is a schematic cross-sectional view of a portion of a thermoplastic layered structure according to another embodiment of the disclosure.

Still in other embodiments, the base layer is formed of a first thermoplastic material, the outer layer is formed of a second thermoplastic material that is the same as the first thermoplastic material, and the intermediate layer includes an infrared-reflective pigment dispersed in a matrix of the same thermoplastic material that makes up the outer and base layers. Accordingly, a smooth material transition is provided between the base layer and the infrared-reflective intermediate layer as well as the outer layer and infrared-reflective intermediate layer, because the thermoplastic matrix material of all three layers is the same, while the infrared-reflective intermediate layer includes infrared-reflective pigments providing an increased infrared reflectance of the intermediate layer. For example, layered structure 610 shown in FIG. 6 includes a base layer 620, an outer layer 640, and an infrared-reflective intermediate layer 630 between base layer 620 and outer layer 640. Infrared-reflective intermediate layer 630 is composed of the same thermoplastic material as base layer 620 and outer layer 640, with the addition of infrared-reflective pigments.

In certain embodiments as otherwise described herein, the concentration of the reflective pigment in the infrared-reflective intermediate layer is at least 5 phr, e.g., at least 10 phr, e.g., at least 20 phr, e.g., in a range from 20 to 100 phr. The concentration of reflective pigment in the infrared-reflective intermediate layer influences both the infrared reflectance of the layer as well as the infrared transmission through the layer. For a layer of a given thickness, increases in the concentration of reflective pigment will result in an increase in the infrared reflectance of the layer and decrease the infrared transmission. Likewise, the thickness of the layer will also influence its reflectance and transmission, where a thicker layer increases reflectance and decreases transmission. Accordingly, thinner layers with a higher concentration of infrared reflective pigment may have a similar performance to thicker layers with lower concentrations of infrared-reflective pigments. Further, data indicates that there is an upper limit to the reflectance that can be achieved through infrared reflective pigment loading of the layer. Accordingly, in some embodiments, layer thickness is kept thin to keep the cost associated with the infrared reflective pigments constrained.

Figure 7:
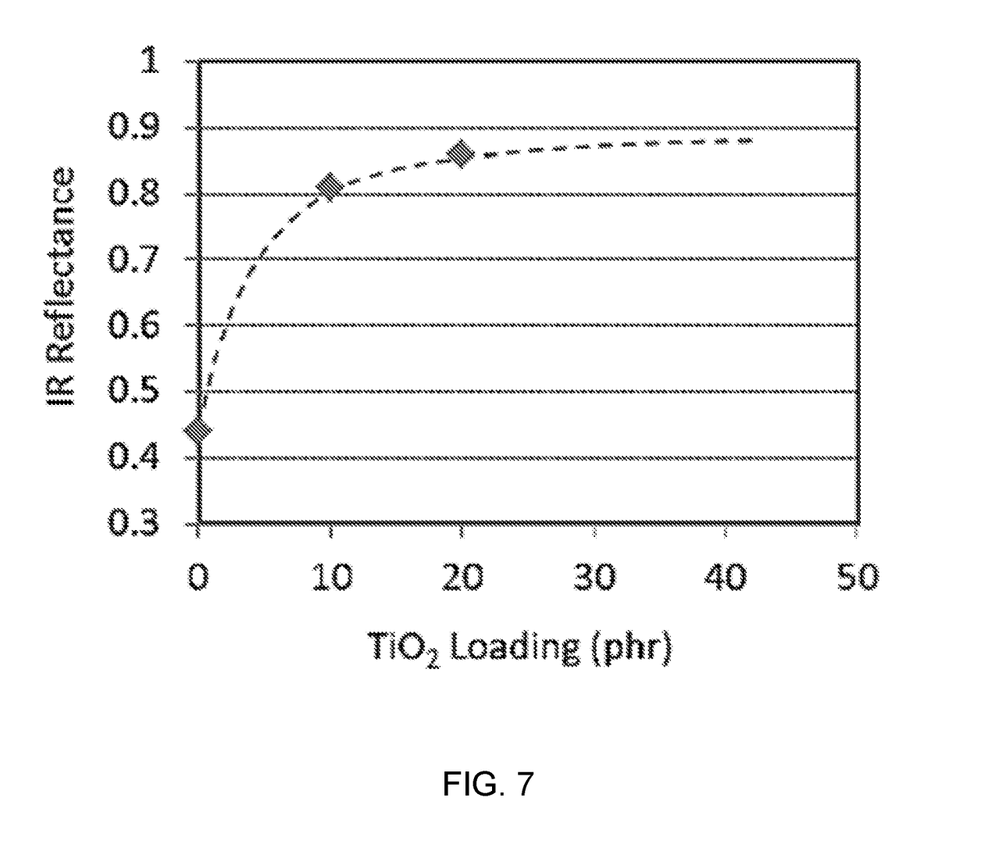
FIG. 7 shows a plot of infrared reflectance of a PVC layer with various TiO2 loading.

Table 1 below shows the infrared reflectance of a PVC layer of 200 μm thickness with different concentrations of $TiO_2$. The reflectance and transmission were calculated as a weighted average by the spectra intensity of the infrared spectrum. The reflectance data in Table 1 is also shown in FIG. 7. As indicated in Table 1 and FIG. 7, the addition of 10 phr $TiO_2$ to the layer nearly doubles the infrared reflectance compared to the PVC alone and reduces the infrared transmission by about 75%. Moreover, further loading of the infrared reflective pigment to 20 phr $TiO_2$ further increases the infrared reflectance and reduces the infrared transmission to less than 1%.

TABLE 1

| Infrared reflectance and transmission of PVC layer with various $TiO_2$ loading | | |
| --- | --- | --- |
| Pigment Loading | Infrared Reflectance | Infrared Transmission |
| 0 phr | 44.2% | 38.4% |
| 10 phr | 81.1% | 8.5% |
| 20 phr | 85.7% | 0.9% |

In certain embodiments as otherwise described herein, the infrared reflective intermediate layer has an infrared reflectance of at least 70%, e.g., between 78% and 92%, e.g., between 80% and 90%. The inventor has found that the inclusion of an infrared reflective intermediate layer with the foregoing infrared reflectance values results in substantial increases in total solar reflectance and corresponding decreases in heat buildup. In particular, the inventor has determined that an infrared-reflective layer having an infrared reflectance between 80% and 90% will impart an increase in solar reflectance ΔSR of +7 to +9 pts and a reduction in heat buildup of ΔHBU of −2.5 to 3.5. Further, these improvements were identified without the synergistic benefit of an outer layer having a low infrared absorption, as described in more detail below.

In certain embodiments as otherwise described herein, the infrared-reflective intermediate layer limits infrared transmission to less than 10%, e.g., less than 5%, less than 1%, e.g., less than 0.5%. This reduction in transmission through the infrared-reflective intermediate layer reduces the solar energy that is absorbed by the base layer, thereby reducing the heat buildup of the base layer and of the layered structure as a whole.

In certain embodiments as otherwise described herein, the material composition of the base layer has a substantially lower infrared reflectance than the material composition of the infrared-reflective intermediate layer, as demonstrated by a difference in infrared reflectance of two layers of the same thickness made using each of the corresponding material compositions. In other words, were two layers constructed using (i) the material composition of the infrared-reflective intermediate layer and (ii) the material composition of the base layer, the infrared reflectance of the layer having the material composition of the infrared-reflective intermediate layer would be substantially higher than that of the other layer. In certain embodiments, the material composition of the base layer has an infrared reflectance that is at least 10% lower than the material composition of the infrared-reflective intermediate layer, e.g., an infrared reflectance that is at least 20% lower, e.g., an infrared reflectance that is at least 30% lower, e.g., an infrared reflectance that is in a range of 40% to 50% lower.

In certain embodiments as otherwise described herein, the material composition of the outer layer has a substantially lower infrared reflectance than the material composition of the infrared-reflective intermediate layer, as measured in the same manner as described above. In certain embodiments, the material composition of the outer layer has an infrared reflectance that is at least 10% lower than the material composition of the infrared-reflective intermediate layer, e.g., an infrared reflectance that is at least 20% lower, e.g., an infrared reflectance that is at least 30% lower, e.g., an infrared reflectance that is in a range of 40% to 50% lower.

In certain embodiments as otherwise described herein, the infrared-reflective intermediate layer includes a first infrared-reflective pigment that has an infrared reflectance that is higher than the infrared reflectance of any other pigment in the layered structure. In some embodiments, the concentration of the first infrared-reflective pigment is higher in the infrared-reflective intermediate layer than in the base layer or the outer layer. For example, in some embodiments, the concentration of the first infrared-reflective pigment in the infrared-reflective intermediate layer is at least 20% higher than the concentration of the first infrared-reflective pigment in the base layer or in the outer layer, e.g., the concentration is at least 50% higher in the infrared-reflective intermediate layer, e.g., the concentration is at least 80% higher in the infrared-reflective intermediate layer, e.g., the concentration is at least twice as high in the infrared-reflective intermediate layer, e.g., the concentration is in a range of 2× to 5× higher in the infrared-reflective intermediate layer, e.g., the concentration is in a range of 5× to 10× higher in the infrared-reflective intermediate layer. In some embodiments, the outer layer is substantially free of the first infrared-reflective pigment. In some embodiments, the base layer is substantially free of the first infrared-reflective pigment.

In certain embodiments as otherwise described herein, the base layer is at least as thick as the infrared-reflective layer, e.g., the base layer is twice as thick as the infrared-reflective layer, e.g., the base layer is 3× as thick as the infrared-reflective layer. Thickness of the base layer should be measured as described above with respect to the infrared-reflective intermediate layer. In certain embodiments as otherwise described herein, the base layer has a thickness of at least 50 micrometers, e.g., at least 100 micrometers, e.g., at least 200 micrometers, e.g., at least 300 micrometers, e.g., at least 500 micrometers, e.g., at least 1 millimeter, e.g., at least 2 millimeters.

In certain embodiments as otherwise described herein, the outer layer has a thickness of at least 30 micrometers, e.g., at least 50 micrometers, e.g., at least 80 micrometers, e.g., at least 100 micrometers, e.g., at least 200 micrometers, e.g., at least 300 micrometers, e.g., at least 500 micrometers. Thickness of the outer layer should be measured as described above with respect to the infrared-reflective intermediate layer. In certain embodiments as otherwise described herein, the outer layer is at least as thick as the infrared-reflective layer, e.g., the outer layer is twice as thick as the infrared-reflective layer, e.g., the outer layer is 3× as thick as the infrared-reflective layer.

In certain embodiments as otherwise described herein, the base layer is made from one or more of a variety of thermoplastic materials. Examples of suitable thermoplastic polymers include polyethylene resin, ethylene-vinyl acetate copolymer resin, polypropylene resin, polystyrene resin, ASA resin, ABS resin, methacrylic resin, PVC resin, polyamide resin, polycarbonate resin, polyethylene terephthalate resin, polybutylene terephthalate resin, diallylphthalate resin, urea resin, melamine resin, xylene resin, phenol resin, unsaturated polyester resin, epoxy resin, furan resin, polybutadiene resin, polyurethane resin, melamine phenol resin, chlorinated polyethylene resin, vinylidene chloride resin, acrylic-vinyl chloride copolymer resin, polyacetal resin, polymethylpentene resin, polyphenylene oxide resin, denatured PPO resin, polyphenylene sulfide resin, butadiene styrene resin, polyamino bismaleimide resin, polysulfone resin, polybutylene resin, silicone resin, polyethylene tetrafluoride resin, polyethylene fluoride propylene resin, perfluoro alkoxy fluoride plastic, polyvinylidene fluoride resin, MBS resin, methacrylic-styrene resin, polyimide resin, polyallylate resin, polyallylsulfone resin, polyethersulfone resin, polyetheretherketone resin, chlorinated polyvinyl chloride resin, and the like.

In certain embodiments as otherwise described herein, the outer layer is made from one or more of a variety of thermoplastic materials. In some embodiments, the outer layer is made of a thermoplastic that is amenable to fabrication through an extrusion process. Examples of suitable thermoplastics are listed above with respect to the base layer.

In addition to the above-described thermoplastic materials and pigments, any or all of the layers may also include various additives and fillers as will be appreciated by those of ordinary skill in the art, such as heat stabilizers, HALS, hindered phenols, SA stabilizers, calcium carbonate, talc and/or other fillers, calcium and zinc stearate for use as processing aids, as well as impact modifiers, nano composite materials such as boehmite, organo-nanoclay, knaff, cellulose fibers, and the like.

In certain embodiments as otherwise described herein, the first thermoplastic material of the base layer is different than the second thermoplastic material of the outer layer. In certain embodiments as otherwise described herein, the base layer includes PVC and the outer layer is a capstock layer including ASA.

In certain embodiments as otherwise described herein, the base layer has a first color. The term color, as used herein, refers to a color other than white.

In certain embodiments as otherwise described herein, the first color of the base layer is a dark color. The term dark color, as used herein, is defined as a color in the CIELAB color space having an L* value of less than 75, e.g., L* value of less than 60, e.g., L* value of less than 50.

In certain embodiments as otherwise described herein, the base layer includes at least one pigment that provides the first color to the outer layer. For example, the base layer may include one or more pigments selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfide yellow, cadmium sulfoselenide orange, and organic pigments such as perylene black, phthalo blue, phthalo green, quinacridone red, diarylide yellow, azo red, and dioxazine purple.

In certain embodiments as otherwise described herein, the outer layer has a second color. In some embodiments, the second color of the outer layer is a dark color. In certain embodiments, the first color and the second color are both dark colors. A construction product having an exterior surface that is a dark color is more susceptible to absorbing solar radiation. Accordingly, the infrared-reflective intermediate layer in accordance with any of the embodiments described herein, may provide particular advantages for a construction product that includes an outer surface that is a dark color.

In certain embodiments as otherwise described herein, the outer layer includes at least one pigment that provides the second color to the outer layer. For example, in some embodiments, the outer layer includes one or more pigments from those listed above with respect to the base layer.

In certain embodiments as otherwise described herein, the first color is similar to the second color. In certain embodiments as otherwise described herein, the first color is substantially the same as the second color, e.g., the first and second colors have a color difference ΔE of no more than 15, e.g., ΔE of no more than 10, e.g., ΔE of no more than 5, e.g., ΔE of no more than 3, e.g., ΔE of no more than 2.

In certain embodiments as otherwise described herein, the infrared-reflective intermediate layer has a third color, and wherein the infrared-reflective intermediate layer includes at least one pigment that provides the third color to the infrared-reflective intermediate layer. The pigment that provides the third color to the infrared-reflective intermediate layer may be an infrared-reflective pigment that provides a visible color, or may be another pigment that is used in cooperation with an infrared-reflective pigment.

In certain embodiments as otherwise described herein, the outer layer has an infrared absorption of no more than 25%, e.g., no more than 20%, e.g., no more than 15%, e.g., in a range of 10% to 15%. The use of an outer layer with a low infrared absorption provides a synergistic effect with the infrared-reflective intermediate layer. The low absorption of the outer layer allows the infrared radiation to pass through the outer layer, be reflected by the intermediate layer, and emitted back through the outer surface of the outer layer. As a result, the energy from the infrared radiation is not absorbed in the layered structure, which improves heat buildup.

In certain embodiments as otherwise described herein, the layered structure has a contoured profile. For example, in some embodiments, the layered structure is an elongate structure that is shaped to have a uniform cross section of a contoured profile that runs along the length of the construction product, where the entire thickness of the layered structure, including each of the layers therein, follows the shape of the contoured profile. For example, construction product 800 shown in FIG. 8 has various flat sections and bent sections that form a contoured profile that is followed by the layered structure.

In certain embodiments as otherwise described herein, the outer layer includes a textured outer surface. For example, in some embodiments the outer layer is embossed to have a certain texture. For example, construction product 900 shown in FIG. 9 has an outer layer that includes a texture 970 that replicates a cut wooden plank. In some embodiments the infrared reflective intermediate layer and the base layer are also shaped in accordance with the texture of the outer surface of the outer layer. In other embodiments the texture of the outer surface is confined to the outer layer of the layered structure, while the intermediate layer and base layer have smooth surfaces.

Figure 8:
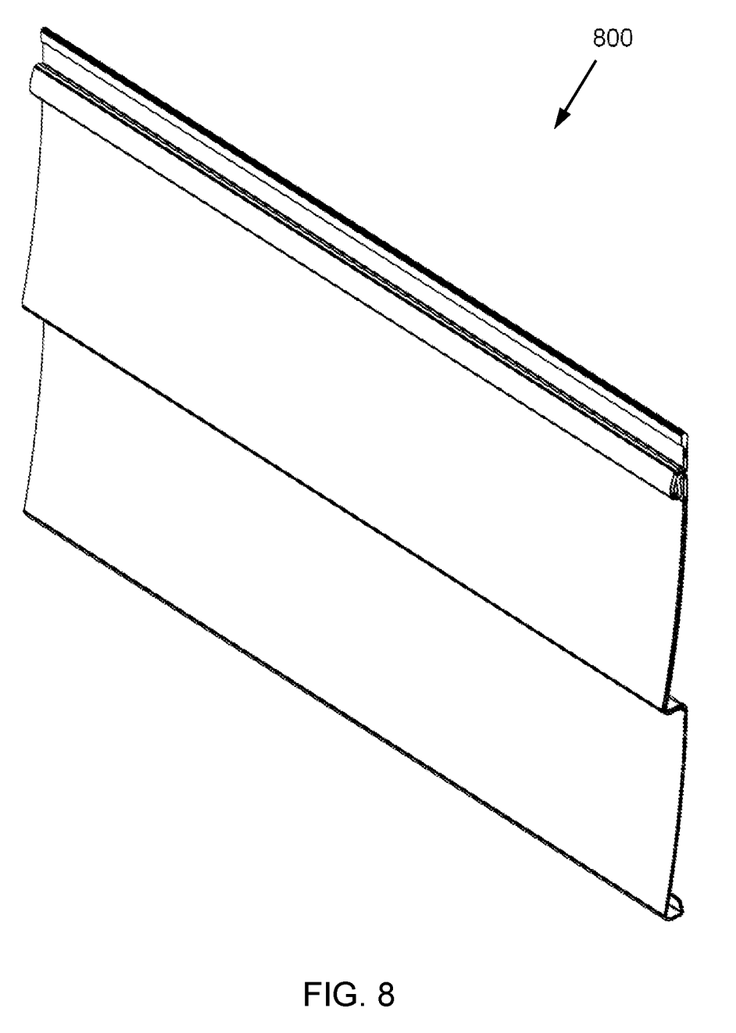
FIG. 8 is a schematic perspective view of siding according to an embodiment of the disclosure.

In certain embodiments as otherwise described herein, the construction product has a tubular configuration. For example, construction product 800 is in the form of a tube. In some embodiments, the layered structure extends around the circumference of the tubular structure. In other embodiments, the layered structure extends only around a portion of the tubular surface. For example, in some embodiments the material forming the base layer extends around the entire circumference of the tubular configuration, but the infrared-reflective intermediate layer and the outer layer extend across only one side of the tubular structure, such as the side that is configured to be exposed to solar radiation.

In certain embodiments as otherwise described herein, the construction product is a surface cladding. For example, in some embodiments the construction product is in the form of a panel that is configured to cover the outer surface of a structure, such as a wall or a roof.

Figure 9:
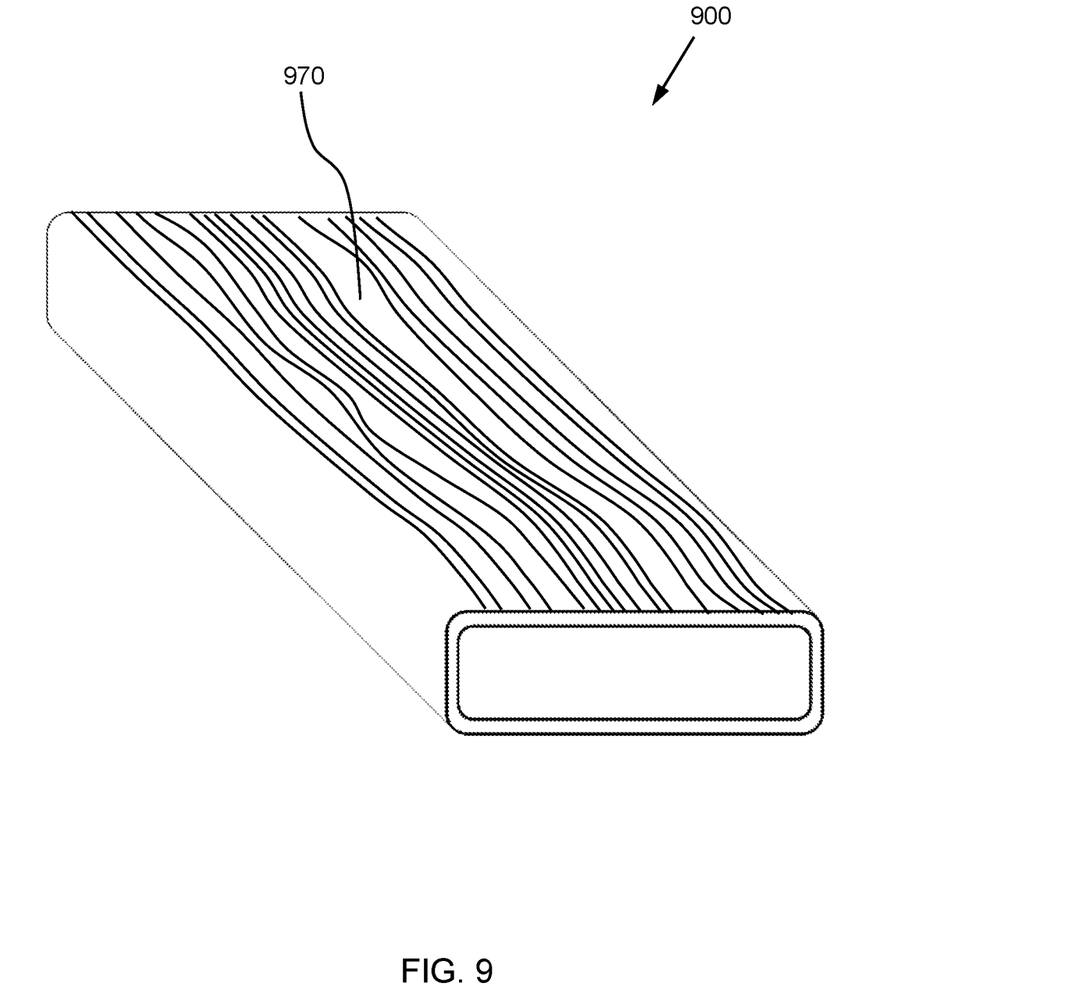
FIG. 9 is a schematic perspective view of a deck plank according to an embodiment of the disclosure.

In certain embodiments as otherwise described herein, the construction product is siding. For example, construction product 900 in FIG. 9 is a two lap siding panel that is configured to cover the exterior wall of a building, such as a house. The siding can be any of a variety of shapes or styles, for example, board and batten, cedar shake, traditional lap, Dutch lap, beaded lap, scalloped, or other configurations as would be appreciated by those of ordinary skill in the art.

In certain embodiments as otherwise described herein, the construction product is a component of a fence. For example, in various embodiments, the construction product is a post, a board, a rail, a panel, or a picket, or another component of a fence, as would be appreciated by a person of ordinary skill in the art.

In certain embodiments as otherwise described herein, the construction product is a decking component. For example, in some embodiments, the construction product is a deck plank or a fascia board. For example, construction product 800 is a deck plank having a tubular profile and including an embossed textured surface on the upper portion of the outer layer.

Another aspect of the disclosure is a method of manufacturing a thermoplastic construction product. The method includes coextruding a base layer, an outer layer, and an infrared reflective intermediate layer through a die so as to form a coextruded layered structure. The coextruded layered structure is formed into a construction product according to any of the embodiments described above.

Figure 10:
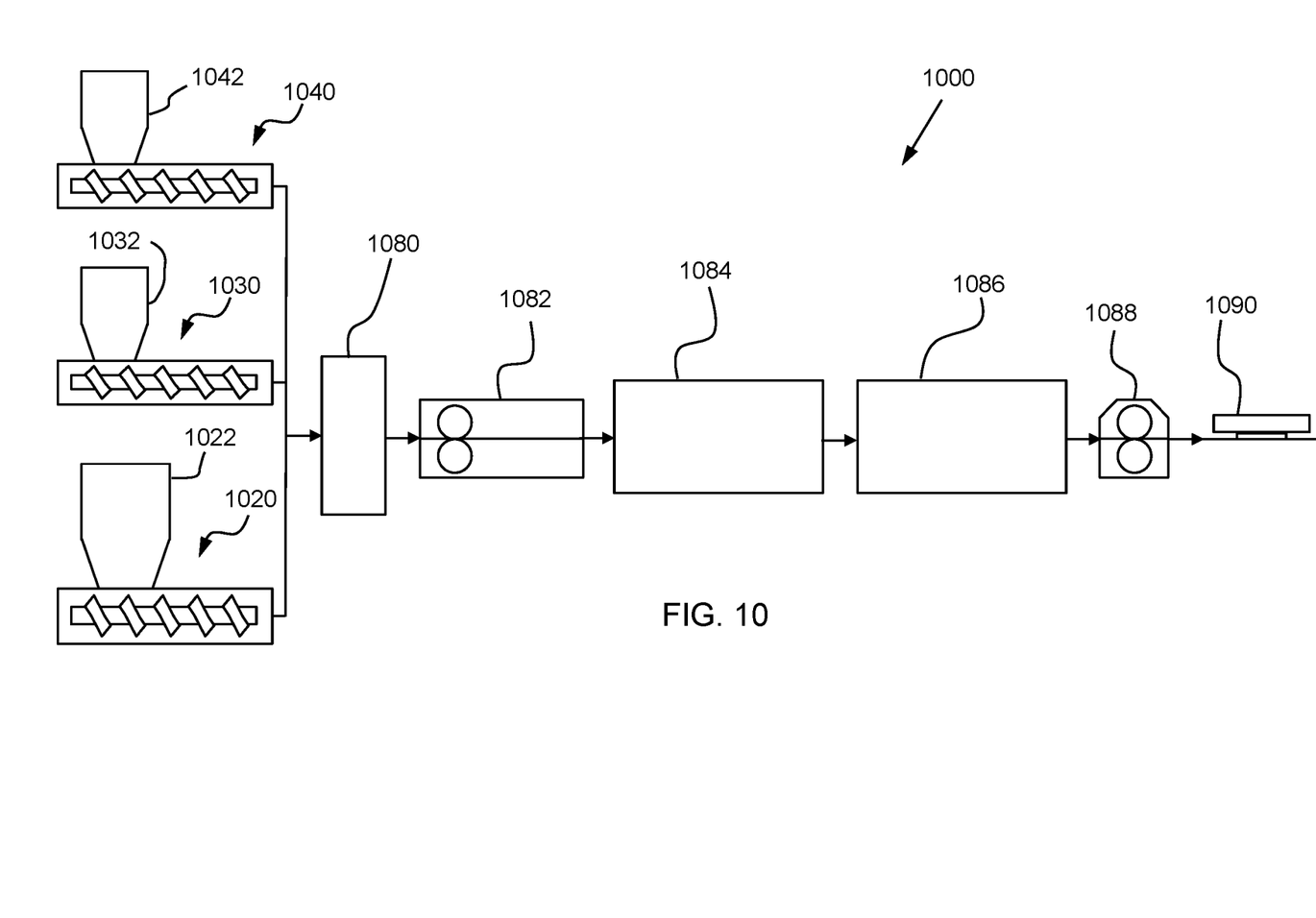
FIG. 10 is a schematic side view of a system for manufacturing a construction product according to a method of an embodiment of the disclosure.

A system for carrying out such a method is schematically shown in FIG. 10. System 1000 includes a die 1080 for coextruding a base layer, an outer layer, and an infrared reflective intermediate layer so as to form coextruded layered structure. In certain embodiments, the coextruded layered structure is formed into the shape of the construction product by the die directly. In other embodiments, a molding apparatus forms the coextruded layered structure into the shape of the construction product. For example, system 1000 includes a molding apparatus 1084 that provides the coextruded layered structure with the shape of the construction product. The molding apparatus can include various different components for forming the layered structure into the shape of the construction product. For example, in some embodiments, the molding apparatus includes a preform die and calibrator. In other embodiments, the molding apparatus includes a belt forming machine or another mold.

In certain embodiments as otherwise described herein, the method includes forming a first mixture including a first thermoplastic material in a first extruder, forming a second mixture including a second thermoplastic material in a second extruder, and forming an infrared-reflective mixture in a third extruder, where the first mixture forms the base layer, the second mixture forms the outer layer, and the infrared reflective mixture forms the infrared-reflective intermediate layer. For example, system 1000 includes a first extruder 1020 that receives one or more materials through a first hopper 1022 in order to form a first mixture in the first extruder 1020. The first mixture formed in the first extruder 1020 includes a first thermoplastic material. First extruder 1020 is positioned to feed the first mixture into an inlet of die 1080 that corresponds to the base layer of the coextruded layered structure.

System 1000 also includes a second extruder 1040 that receives one or more materials through a second hopper 1042 in order to form a second mixture in the second extruder 1040. The second mixture formed in the second extruder 1040 includes a second thermoplastic material. Second extruder 1040 is positioned to feed the second mixture into an inlet of die 1080 that corresponds to the outer layer of the coextruded layered structure.

System 1000 also includes a third extruder 1030 that receives one or more materials through a third hopper 1032 in order to form an infrared-reflective mixture in the third extruder 1040. Third extruder 1030 is positioned to feed the infrared-reflective mixture into an inlet of die 1080 that corresponds to the infrared-reflective intermediate layer of the coextruded layered structure.

In certain embodiments as otherwise described herein, each of the extruders includes one or more rotatable screws configured to mix the component materials introduced into the respective extruder body and to convey the mixture to the outlet of the respective extruder body. The person of ordinary skill in the art will appreciate that a wide variety of screw designs are suitable for use in the extruder including single or twin screws and having sections with various configurations including, but not limited to, transfer screws, slotted screws, lobal screws, kneading blocks, reverse screws and combinations thereof.

While each of the extruders in system 1000 are fed with a single hopper, in other embodiments one or more of the extruders may be fed through more than one hopper or inlet opening. For example, in some embodiments, the extruders are fed, at least in part, by other upstream extruders.

In certain embodiments as otherwise described herein, the method includes adding an infrared reflective pigment to the infrared-reflective mixture in third extruder. For example, in system 1000, infrared-reflective pigment is added through hopper 1032 to third extruder 1030 where it is mixed with a thermoplastic material to form the infrared-reflective mixture.

In certain embodiments as otherwise described herein, the method includes adding a first pigment to the first mixture in the first extruder so as to provide the base layer with a first color. For example, in system 1000, a coloring pigment is added through hopper 1022 to first extruder 1020 where it is mixed with the first thermoplastic material to form the first mixture.

In certain embodiments as otherwise described herein, the method includes adding a second pigment to the second mixture in the second extruder so as to provide the outer layer with a second color. For example, in system 1000, a coloring pigment is added through hopper 1042 to second extruder 1040 where it is mixed with the second thermoplastic material to form the second mixture. In system 1000, the same pigment is added to first extruder 1020 and second extruder 1040, such that the first and second mixtures have similar colors. In other embodiments, the pigments added to the different extruders are different.

In certain embodiments as otherwise described herein, the method includes adding a third pigment to the infrared-reflective mixture in the third extruder so as to provide the infrared-reflective intermediate layer with a third color. For example, in system 1000, a coloring pigment is added through hopper 1032 to third extruder 1030 where it is mixed with the infrared-reflective pigment and thermoplastic material in the infrared-reflective mixture.

In certain embodiments as otherwise described herein, the method includes shaping the coextruded layered structure so as to provide the coextruded layered structure with a contoured profile. For example, the molding apparatus 1084 of system 1000 forms bends into the cross section of the layered structure so as to provide the layered structure with the contoured profile of two-lap siding.

In certain embodiments as otherwise described herein, the method includes providing an outer surface of the outer layer of the coextruded layered structure with a textured surface. For example, system 1000 includes an embosser 1082 for placing a textured surface into the surface of the outer layer of the layered structure.

In certain embodiments the method includes other steps of processing the coextruded layered structure, and the system for carrying out the method includes corresponding components. For example, as will be understood by those of ordinary skill in the art, the system may include components for cooling, finishing, moving, punching, notching and other processing steps. For example, system 1000 also includes water bath 1086 for cooling the coextruded layered structure, a pair of rollers 1088 for moving the coextruded layered structure through the system and a cutter 1090 for cutting the coextruded layered structure into the formed construction products.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

EMBODIMENTS

Embodiment 1. A thermoplastic construction product comprising:
  a coextruded layered structure including:
    a base layer including a first thermoplastic material;
    an outer layer including a second thermoplastic material; and
    an infrared-reflective intermediate layer that is coextruded with the base layer and the outer layer and is disposed between the base layer and the outer layer, the infrared-reflective intermediate layer having a thickness of at least 30 micrometers.

Embodiment 2. A thermoplastic construction product comprising:
  a coextruded layered structure including:
    a base layer including a first thermoplastic material;
    an outer layer including a second thermoplastic material; and
    an infrared-reflective intermediate layer that is coextruded with the base layer and the outer layer and is disposed between the base layer and the outer layer, the infrared-reflective intermediate layer including a reflective pigment dispersed in a matrix of one of the first thermoplastic material or the second thermoplastic material.

Embodiment 3. The thermoplastic construction product according to embodiment 1, wherein the infrared-reflective intermediate layer includes a reflective pigment dispersed in a thermoplastic matrix.

Embodiment 4. The thermoplastic construction product according to embodiment 2 or 3, wherein a concentration of the reflective pigment in the infrared-reflective intermediate layer is at least 5 phr, e.g., at least 10 phr, e.g., at least 20 phr, e.g., up to 100 phr.

Embodiment 5. The thermoplastic construction product according to any of embodiments 1 to 4, wherein the infrared reflective intermediate layer has an infrared reflectance of at least 70%, e.g., between 78% and 92%, e.g., between 80% and 90%.

Embodiment 6. The thermoplastic construction product according to any of embodiments 1 to 5, wherein the infrared reflective intermediate layer limits infrared transmission to less than 10%, e.g., less than 5%, less than 1%, e.g., less than 0.5%.

Embodiment 7. The thermoplastic construction product according to any of embodiments 1 to 6, wherein the base layer is at least as thick as the infrared-reflective layer, e.g., the base layer is twice as thick as the infrared-reflective layer, e.g., the base layer is 3× as thick as the infrared-reflective layer.

Embodiment 8. The thermoplastic construction product according to any of embodiments 1 to 7, wherein the base layer has a thickness of at least 50 micrometers, e.g., at least 100 micrometers, e.g., at least 200 micrometers, e.g., at least 300 micrometers, e.g., at least 500 micrometers, e.g., at least 1 millimeter, e.g., at least 2 millimeters.

Embodiment 9. The thermoplastic construction product according to any of embodiments 1 to 8, wherein the outer layer is at least as thick as the infrared-reflective layer, e.g., the outer layer is twice as thick as the infrared-reflective layer.

Embodiment 10. The thermoplastic construction product according to any of embodiments 1 to 9, wherein the outer layer has a thickness of at least 30 micrometers, e.g., at least 50 micrometers, e.g., at least 80 micrometers, e.g., at least 100 micrometers, e.g., at least 200 micrometers, e.g., at least 300 micrometers, e.g., at least 500 micrometers.

Embodiment 11. The thermoplastic construction product according to any of embodiments 1 to 10, wherein the first thermoplastic material of the base layer is different than the second thermoplastic material of the outer layer.

Embodiment 12. The thermoplastic construction product according to any of embodiments 1 to 11, wherein the outer layer has a first color.

Embodiment 13. The thermoplastic construction product according to embodiment 12, wherein the first color of the outer layer is a dark color.

Embodiment 14. The thermoplastic construction product according to embodiment 12 or embodiment 13, wherein the outer layer includes at least one pigment that provides the first color to the outer layer.

Embodiment 15. The thermoplastic construction product according to any of embodiments 1 to 14, wherein the base layer has a second color.

Embodiment 16. The thermoplastic construction product according to embodiment 15, wherein the second color of the base layer is a dark color.

Embodiment 17. The thermoplastic construction product according to embodiment 15 or embodiment 16, wherein the base layer includes at least one pigment that provides the second color to the base layer.

Embodiment 18. The thermoplastic construction product according to any of embodiments 15 to 17, wherein the first color is similar to the second color.

Embodiment 19. The thermoplastic construction product according to embodiment 18, wherein the first color is substantially the same as the second color, e.g., the first and second colors have a color difference ΔE of less than 3.

Embodiment 20. The thermoplastic construction product according to any of embodiments 1 to 19, wherein the infrared-reflective intermediate layer has a third color, and wherein the infrared-reflective intermediate layer includes at least one pigment that provides the third color to the infrared-reflective intermediate layer.

Embodiment 21. The thermoplastic construction product according to any of embodiments 1 to 20, wherein the outer layer has an infrared absorption of no more than 25%, e.g., no more than 20%, e.g., no more than 15%.

Embodiment 22. The thermoplastic construction product according to any of embodiments 1 to 21, wherein the layered structure has a contoured profile.

Embodiment 23. The thermoplastic construction product according to any of embodiments 1 to 22, wherein the outer layer includes a textured outer surface.

Embodiment 24. The thermoplastic construction product according to any of embodiments 1 to 23, wherein the construction product is a surface cladding.

Embodiment 25. The thermoplastic construction product according to embodiment 24, wherein the construction product is siding.

Embodiment 26. The thermoplastic construction product according to any of embodiments 1 to 23, wherein the construction product is a component of a fence.

Embodiment 27. The thermoplastic construction product according to any of embodiments 1 to 23, wherein the construction product is a decking component.

Embodiment 28. A method of manufacturing a thermoplastic construction product, the method comprising:
  coextruding a base layer, an outer layer, and an infrared reflective intermediate layer through a die so as to form a coextruded layered structure; and forming the coextruded layered structure into a construction product according to any of embodiments 1 to 26.

Embodiment 29. The method according to embodiment 28, further comprising:
forming a first mixture including a first thermoplastic material in a first extruder,
forming a second mixture including a second thermoplastic material in a second extruder, and
forming an infrared-reflective mixture in a third extruder, wherein the first mixture forms the base layer, the second mixture forms the outer layer and the infrared reflective mixture forms the infrared-reflective intermediate layer.

Embodiment 30. The method according to embodiment 29, further comprising adding an infrared reflective pigment to the infrared-reflective mixture in third extruder.

Embodiment 31. The method according to embodiment 29 or 30, further comprising adding a first pigment to the first mixture in the first extruder so as to provide the base layer with a first color.

Embodiment 32. The method according to any of embodiments 29 to 31, further comprising adding a second pigment to the second mixture in the second extruder so as to provide the outer layer with a second color.

Embodiment 33. The method according to any of embodiments 29 to 32, further comprising adding a third pigment to the infrared-reflective mixture in the third extruder so as to provide the infrared-reflective intermediate layer with a third color.

Embodiment 34. The method according to any of embodiments 28 to 33, wherein forming the coextruded layered structure into the construction product includes shaping the coextruded layered structure so as to provide the coextruded layered structure with a contoured profile.

Embodiment 35. The method according to any of embodiments 28 to 34, wherein forming the coextruded layered structure into the construction product includes providing an outer surface of the outer layer of the coextruded layered structure with a textured surface.

What is claimed is:

1. A thermoplastic construction product comprising:
a coextruded layered structure including:
a base layer having a thickness of at least 500 micrometers and including a first thermoplastic material;
an outer layer including a second thermoplastic material and calcium carbonate or talc as a filler; and
an infrared-reflective intermediate layer that is coextruded with the base layer and the outer layer and is disposed between the base layer and the outer layer, the infrared-reflective intermediate layer having a thickness of at least 30 micrometers,
wherein the outer layer has a first dark color having a value of $L^*$ in the CIELAB color space of less than 50, and is at least as thick as the infrared-reflective intermediate layer; and
wherein the thermoplastic construction product is configured as a surface cladding for an outer surface of a structure.

2. The thermoplastic construction product according to claim 1, wherein the infrared-reflective intermediate layer includes a reflective pigment dispersed in a thermoplastic matrix.

3. The thermoplastic construction product according to claim 2, wherein the thermoplastic matrix is formed of the first thermoplastic material.

4. The thermoplastic construction product according to claim 2, wherein the thermoplastic matrix is formed of the second thermoplastic material.

5. The thermoplastic construction product according to claim 1, wherein the infrared reflective intermediate layer limits infrared transmission to less than 10%.

6. The thermoplastic construction product according to claim 1, wherein the first thermoplastic material of the base layer is different than the second thermoplastic material of the outer layer.

7. The thermoplastic construction product according to claim 1, wherein the base layer has a second dark color having a value of $L^*$ in the CIELAB color space of less than 50, and wherein the base layer further comprises calcium carbonate or talc as a filler.

8. The thermoplastic construction product according to claim 7, wherein the first dark color and the second dark color have a color difference $\Delta E$ of no more than 5.

9. The thermoplastic construction product according to claim 1, wherein the outer layer has an infrared absorption of no more than 25%.

10. The thermoplastic construction product according to claim 1, wherein the construction product is siding.

11. The thermoplastic construction product according to claim 1, wherein the infrared reflective intermediate layer has an infrared reflectance of at least 70%.

12. The thermoplastic construction product according to claim 1, wherein the infrared reflective intermediate layer limits infrared transmission to less than 1%.

13. The thermoplastic construction product according to claim 1, wherein the base layer is at least as thick as the infrared-reflective intermediate layer.

14. The thermoplastic construction product according to claim 1, wherein the outer layer has an infrared absorption of no more than 20%.

15. A method of manufacturing a thermoplastic construction product according to claim 1, the method comprising:
coextruding a base layer including a first thermoplastic material, an outer layer including a second thermoplastic material, and an infrared reflective intermediate layer through a die so as to form a coextruded layered structure; and
forming the coextruded layered structure into a construction product including the base layer, the outer layer, and the infrared reflective layer disposed between the base layer and the outer layer, the infrared-reflective intermediate layer having a thickness of at least 30 micrometers.

16. The method according to claim 15, further comprising:
forming a first mixture including the first thermoplastic material in a first extruder,
forming a second mixture including the second thermoplastic material in a second extruder, and
forming an infrared-reflective mixture including an infrared reflective pigment in a third extruder,
wherein the first mixture forms the base layer, the second mixture forms the outer layer and the infrared reflective mixture forms the infrared-reflective intermediate layer.

17. The method according to claim 16, further comprising adding a first pigment to the first mixture in the first extruder so as to provide the base layer with a first color, and adding a second pigment to the second mixture in the second extruder so as to provide the outer layer with a second color.

18. The method according to claim 15, wherein forming the coextruded layered structure into the construction product includes shaping the coextruded layered structure so as to provide the coextruded layered structure with a contoured profile.

19. The method according to claim 15, wherein forming the coextruded layered structure into the construction product includes providing an outer surface of the outer layer of the coextruded layered structure with a textured surface.

* * * * *